United States Patent
Driver et al.

(10) Patent No.: US 10,352,757 B2
(45) Date of Patent: Jul. 16, 2019

(54) ANIMAL WEIGHING APPARATUS AND METHODS

(71) Applicant: PRECISION PASTORAL PTY LTD, Alice Springs (AU)

(72) Inventors: Timothy Kenneth Driver, Alice Springs (AU); James Richard Hugh Christian, Alice Springs (AU)

(73) Assignee: PRECISION PASTORAL PTY LTD, Alice Springs, Northern Territory (AU)

( * ) Notice: Subject to any disclaimer, the term of this patent is extended or adjusted under 35 U.S.C. 154(b) by 0 days.

(21) Appl. No.: 15/309,064

(22) PCT Filed: May 12, 2015

(86) PCT No.: PCT/AU2015/050234
§ 371 (c)(1),
(2) Date: Nov. 4, 2016

(87) PCT Pub. No.: WO2015/172192
PCT Pub. Date: Nov. 19, 2015

(65) Prior Publication Data
US 2017/0219415 A1    Aug. 3, 2017

(30) Foreign Application Priority Data
May 12, 2014 (AU) ................................. 2014901748

(51) Int. Cl.
*A01K 1/06* (2006.01)
*A01K 29/00* (2006.01)
*G01G 17/08* (2006.01)

(52) U.S. Cl.
CPC ........... *G01G 17/08* (2013.01); *A01K 1/0613* (2013.01); *A01K 29/00* (2013.01)

(58) Field of Classification Search
CPC ... G01F 25/0061; G01F 23/266; G01F 23/268
(Continued)

(56) References Cited

U.S. PATENT DOCUMENTS 4,569,408 A * 2/1986 Berns ..................... G01G 21/08
177/132
4,850,441 A * 7/1989 Mosdal ................... G01G 17/08
177/136
(Continued)

FOREIGN PATENT DOCUMENTS

CN          203837786 U    9/2014
FR          2916846 A1    12/2008
(Continued)

OTHER PUBLICATIONS

Written Opinion of the International Searching Authority dated Jul. 2, 2015 for corresponding International Patent Applciation PCT/AU2015/050234 filed on May 12, 2015.
(Continued)

*Primary Examiner* — Jacques M Saint Surin
(74) *Attorney, Agent, or Firm* — David D. Brush; Westman, Champlin & Koehler, P.A.

(57) ABSTRACT

The present invention provides a platform and/or associated structure for weighing an animal, the platform and/or associated structure being configured to conceal, or configured to facilitate concealment, from the animal of a foreign sensory stimulus of the platform and/or associated structure. The platform may be configured to retain a natural material (such as soil) or a simulated natural material on or about the platform and/or associated structure. The platform is typically incorporated into a weighing apparatus for use with larger animals such as cattle.

20 Claims, 5 Drawing Sheets

(58) Field of Classification Search
USPC .......................................................... 177/133
See application file for complete search history.

(56) References Cited

U.S. PATENT DOCUMENTS

| | | | |
|---|---|---|---|
| 5,852,989 A | 12/1998 | Fuchs | |
| 2004/0168836 A1* | 9/2004 | Petrucelli | G01G 17/08 177/199 |
| 2005/0006153 A1* | 1/2005 | Baarsch | A01K 1/0023 177/25.13 |
| 2009/0178859 A1* | 7/2009 | Kleinsasser | G01G 17/08 177/108 |
| 2010/0181316 A1* | 7/2010 | Moore | B65F 1/1615 220/326 |

FOREIGN PATENT DOCUMENTS

| | | | |
|---|---|---|---|
| GB | 1219408 A | 1/1971 | |
| GB | 2476406 A | 6/2011 | |

OTHER PUBLICATIONS

International Search Report dated Jul. 2 2015, for corresponding International Patent Application PCT/AU2015/050234 filed on May 12, 2015.
The Guardian: London zoo's animals are weighed—in pictures [ viewed on internet on Jun. 29, 2015] Viewed on internet. URL: http://www.theguardian.com/world/gallery/2013/aug/21/london-zoo-animals-weighed-in-pictures>, Published on Aug. 22, 2013.

* cited by examiner

ANIMAL WEIGHING APPARATUS AND METHODS

CROSS REFERENCE TO RELATED APPLICATIONS

The present application is a Section 371 National Stage Application of International Application No. PCT/AU2015/050234, filed May 12, 2015, which is incorporated by reference in its entirety and published as WO 2015/172192 A1 on Nov. 19, 2015, in English.

FIELD OF THE INVENTION

The present invention is broadly directed to the field of animal management, and in particular to apparatus and methods for weighing animals.

BACKGROUND TO THE INVENTION

It is often necessary to obtain an accurate weight of an animal. For example cattle, sheep and other animals of economic importance may require frequent weighing for herd management or breeding reasons.

For example, a farmer will typically wish to control feeding by maintaining proper growth rate charts on his animals. It is also beneficial to keep a chart on each animal as means for keeping track of health conditions and maturity. Consequently it is necessary to periodically weigh the animals. As another example, a substantial weight drop of a remotely recorded weight of a pregnant cow may indicate the animal has calved. The date of weight drop may be indicative of the calving date.

A weighing apparatus is typically comprised of a floating platform, under which one or more load cells are disposed. The animal is directed onto the platform, with the platform being urged downwardly on and compressing the load cells. The amount of compression is proportional to the weight of the animal therefore allowing a weight to be calculated.

It is a problem in the art that animals can take some time to train in the use of a weighing platform. For cattle, a period of around two weeks is typically required to train the animal to walk onto the platform and remain relatively stationary to allow an accurate weight to be obtained. Animals often hesitate to walk onto the platform, and must be lead or pushed on it. Even once on the platform, an animal may move constantly, thereby causing fluctuations in the weight recorded. Generally, a period of time passes before the animal calms down, and ceases moving such that the weight recording stabilizes.

Some prior art methods to facilitate an animal stepping onto the scale and settling rely on providing food to lure the animal into position During the training period, significant operator time is taken in weighing animals, this leading to a loss in productivity in a commercial farming operation.

It is an aspect of the present invention to overcome a problem of the prior art to provide improved weighing apparatus and methods, or to at least provide a useful alternative to apparatus and methods of the prior art.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect, the present invention provides a platform and/or associated structure for weighing an animal, the platform and/or associated structure being configured to conceal, or configured to facilitate concealment, from the animal of a foreign sensory stimulus of the platform and/or associated structure.

In one embodiment, the foreign sensory stimulus is a visual stimulus. The visual stimulus may relate to a material of the platform and/or associated structure, or a position of the platform and/or associated structure.

The visual stimulus is the substantially uniform appearance or the high reflectance of the platform and/or associated structure, or a step formed by the platform or associated structure with the surrounding ground.

In one embodiment, the foreign sensory stimulus is a tactile stimulus. The tactile stimulus may be that resulting from the contact of a limb of the animal on a raised edge of the platform and/or associated structure. In addition or alternatively, the tactile stimulus is the texture, give or temperature of the platform and/or associated structure under foot. In addition or alternatively, the tactile stimulus is the movement of the platform and/or associated structure under foot.

In one embodiment, the foreign sensory stimulus is an olfactory stimulus. The olfactory stimulus may relate to a material of the platform and/or associated structure.

In one embodiment, the foreign stimulus is an auditory stimulus. The auditory stimulus is the sound made by an animal's foot when contacting the platform and/or associated structure.

In one embodiment, the platform and/or associated structure is/are configured to resemble a natural ground surface.

In one embodiment, the platform and/or associated structure comprises an overlay of a natural material, or a simulated natural material. The natural material is a soil and/or sand and/or a gravel, and/or a grass. The simulated natural material has the appearance and/or feel, and or smell and/or sound of soil, sand, gravel, grass or leaves.

In one embodiment, the platform and/or associated structure is/are configured to retain a natural material or a simulated natural material on or about the platform and/or associated structure.

In one embodiment, the platform and/or associated structure comprises a series of depressions configured to retain the natural material or simulated natural material.

In one embodiment, the platform and/or associated structure comprises one or more retaining members configured to retain the natural material on or about the platform and/or associated structure.

In one embodiment the retaining members are two elongate members running substantially parallel to each long edge of the platform and/or associated structure.

In one embodiment, the platform and/or associated structured is configured to support at least the weight of an adult sheep or cow.

In a second aspect the present invention provides a weighing apparatus comprising a weighing platform and/or associated structure as described herein.

In one embodiment, the weighing apparatus is configured such that the platform and/or associated structure is/are configured to be (i) substantially flush with the surrounding ground, or (ii) to appear to the animal to be substantially flush with the surrounding ground when a natural material is retained on or about the platform and/or associated structure.

In one embodiment, the weighing apparatus comprises one or more load cells, wherein the one or more load cells is/are disposed substantially lateral to or beneath the weighing platform and/or associated structure.

In one embodiment, the weighing apparatus is substantially portable.

In a third aspect, the present invention provides a method of weighing an animal, the method comprising the steps of providing the weighing apparatus as described herein, and directing an animal onto the platform, or allowing an animal onto the platform.

In one embodiment, the method comprises the step of placing a natural material or simulated natural material on or about the platform and/or associated structure, before the step of directing an animal on the platform or allowing an animal onto the platform.

DETAILED DESCRIPTION OF THE INVENTION

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

The present invention is predicated at least in part on Applicant's finding that the period for training livestock animals to step onto and settle on a weighing platform is substantially shortened where the platform and/or structures associated with the weighing platform appear natural. This is achieved by avoiding or concealing a foreign sensory stimulus of the weighing platform or associated structures. Accordingly, in one aspect the present invention provides a platform and/or associated structure for weighing an animal, the platform and/or associated structure being configured to conceal, or configured to facilitate concealment, from the animal of a foreign sensory stimulus of the platform and/or associated structure.

Applicant has discovered that foreign stimuli in particular about the lower limbs of animals are a significant cause for hesitation in an animal being directed onto a weighing platform. At least one foreign stimulus in the form of a visual, tactile, auditory, or olfactory stimulus, or any of two or more of these stimuli in any combination may be a sufficient deterrent to an animal stepping on a weighing platform.

Advantageously, use of the present invention has been shown to decrease the training period for a cow to use the weighing apparatus from about two weeks to about two days. The rapidity in training results in the ability to weigh a greater number of animals in a shorter amount of time. The shorter training period also means that staff time taken up for training animals is substantially lessened.

As used herein, the word "foreign" in context of the term "foreign stimulus" stimulus" is meant in reference to the animal concerned, and the normal environment of that animal. Taking a cow at pasture as an example, the term "foreign stimulus" would include any sensory stimulus not regularly encountered by the animal when in the pasture. The cow will normally be exposed to soil, grass, gravel, trees, other cows and the like, and so the sensory stimuli of these things would not be considered foreign to the cow given its regular exposure to such things. However, artificial objects such as metallic objects and plastics are not regularly encountered by the cow and thus will be considered a foreign stimulus. Foreign stimuli that are proposed to be particularly effective at deterring an animal from stepping on a weighing platform are those which are encountered about the lower limbs of the animal, and particular those caused by materials underfoot.

As used herein, the term "platform" is intended to mean any structure upon which an animal may stand to allow for a weight to be obtained. The term "associated structure" as used in relation to a platform is intended to mean any structure that structurally or functionally associated with the platform. Some associated structures may be a threshold, ramp or other surround of the platform, a guide or rail about the lower limbs of the animal and the like.

The foreign sensory stimulus may be a visual stimulus associated with a weighing platform or associated structure that causes the animal to hesitate. For example, the materials from which prior art platforms are fabricated may interfere with the propensity for an animal to easily walk onto a weighing platform. Prior art platforms are typically fabricated from high strength steel which has a more even appearance and typically a higher reflectance as compared with the ground upon which the animal normally walks. Therefore, even before the animal steps onto the platform the mere appearance of the platform is very different to the animal. The animal may not be certain that the platform will provide a sure footing and will hesitate or even completely avoid stepping onto the platform.

In one embodiment, the platform and/or associated structure comprises an overlay on the platform and/or associated structure, the overlay comprising a natural material or a simulated natural material. The overlay may be soil, sand, gravel, grass or leaves. Alternatively, the overlay may be a simulated natural material having the appearance and/or feel, and or smell and/or sound of soil, sand, gravel, grass or leaves.

Another visual stimulus which may be avoided in one embodiment of the present invention is the step presented to the animal by weighing platforms of the prior art. The sight of a step (being a foreign stimulus) leads to hesitation in an animal, the hesitation needing to be trained out of the animal over an extended period of time. Thus, the present weighing platforms may comprise a flexible cover extending from the edge of the weighing platform to the ground, the cover acting to conceal the edge of the weighing platform. The flexibility of the cover allows for the platform to move freely vertically (as it must to properly exert a force on the load cells when an animal is being weighed) while still concealing the platform edge.

The flexible cover may in turn be concealed by a layer of a natural material or a simulated natural material to diminish or remove any foreign stimulus provided by the flexible cover. Thus, in one embodiment the flexible cover may comprise an overlay comprising a natural material or a simulated natural material. The overlay may be soil, sand, gravel, grass or leaves. Alternatively, the overlay may be a simulated natural material having the appearance and/or feel, and or smell and/or sound of soil, sand, gravel, grass or leaves.

Applicant proposes that it is not only stimuli that can lead to hesitation on an animal stepping onto a weighing platform. Tactile factors may be important, particularly with regard to how a substance feels underfoot to an animal. Prior art weighing platforms are typically fabricated from steel and have no give underfoot. Accordingly, and animal placing a first foot onto the platform will immediately experience a foreign feeling underfoot having been used to walking on softer ground. The animal may hesitate to continue moving forward and onto the platform. Platforms having an overlay which diminishes the foreign tactile stimulus provided by a material such as steel lower the occurrence of such hesitation in an animal.

Applicant further proposes that the smell (or lack of smell) in a weighing platform of associated structure can present a foreign stimulus to an animal, thereby leading to hesitation. The ground upon which an animal normally walks has a familiar sent, and an animal walking toward a platform or an associated structure having an unfamiliar scent or no scent may hesitate. For example, some prior art weighing apparatus have rubberized components on or about the platform. Such components can emit a chemical smell which is detectable by the animal as a foreign stimulus.

Animals may further consider auditory stimuli as foreign. The sound of an animal's own hoof on a platform or associated structure may be unfamiliar, and lead to hesitation. This is especially the case for meal components which can emit a harsh sound when trodden on by an animal. A natural material such as soil overlaid on a metallic component will diminish any foreign sound and lower the chance of hesitation.

The overlay may be fixed to the platform or the associated structure, may be added by a user. Typically, the latter approach leads to greater advantage because a natural material in the immediate environment on site may be used for an overlay, with animals already being familiar with the look and feel of the substance.

For example, a weighing apparatus having a platform of the present invention may be transported to a site, and the local soil may be dug up and used as an overlay. On some sites the soil may be of a light color and looser in composition, and in others the soil may be darker and have a greater clay component. These soils will look and feel different to an animal, and so the use of an unfamiliar soil may lead to an animal showing greater hesitation compared with the circumstance where a familiar soil is used as the overlay.

By contrast with the prior art, a weighing platform and/or associated structure of the present invention does not present a foreign sensory stimulus, or at least presents a foreign sensory stimulus of a lower intensity, or at least a lower number of foreign sensory stimuli to the animal. The removal or diminishment of foreign sensory stimuli facilitates the animal stepping onto the platform or associated structure thereby lessening training time.

In one embodiment, the platform and/or associated structure is/are configured to retain a natural material or simulated nature material. As discussed supra, a particularly advantageous embodiment is where the overlay is consists of a natural material from the immediate environment of the animal. Given that the appearance, feel, smell or sound of the natural substance in the environment may change according to the site of weighing, it is preferred that the platform and/or associated structure is configured to allow for the overlay material to be changed as required according to the change in local conditions.

In one embodiment, the platform and/or associated structure is/are configured to retain a soil on or about the platform and/or associated structure. As will be appreciated, a layer of more than minimal depth is required to conceal the underlying foreign sensory stimulus of a metal platform. To assist in maintaining a useful depth of soil, a lip or a low wall may be provided about the edge of the platform to retain soil. The lip or wall may extend about the entire perimeter of the platform of may only run along the long sides of the platform, the short ends of platform remaining open and therefore able to remain substantially flush with the surrounding ground.

Alternatively or in addition to that approach, the platform may comprise a series of depressions within which soil may sit. A depression may have a depth of at least about 20 mm, 30 mm, 40 mm, 50 mm, 60 mm, 70 mm, 80 mm, 90 mm or 100 mm. The depressions may have a depth of at less than about 100 mm, 90 mm, 80 mm, 70 mm, 60 mm, 50 mm, 40 mm, 30 mm or 20 mm. Preferably the depression has a depth of from about 25 mm to about 70 mm. In a highly preferred embodiment the depression has a depth of about 50 mm.

In a preferred embodiment, a depression is a channel extending across the path along which the animal travels (which is typically the longitudinal axis of the platform where the platform is elongate). The channel may have a substantially planar base, and optionally substantially planar walls which extend away from the base at an obtuse angle. The obtuse angle may be at least about 100 degrees, 115 degrees, 120 degrees, 125 degrees, 130 degrees, 135 degrees, 140 degrees, 145 degrees, 150 degrees, 155 degrees, 160 degrees, 165 degrees, or 170 degrees. In another embodiment, the obtuse angle may be less that about 170 degrees, 165 degrees, 160 degrees, 155 degrees, 150 degrees, 145 degrees, 140 degrees, 135 degrees, 130 degrees, 125 degrees, 120 degrees, 115 degrees, or 110 degrees. Preferably, the obtuse angle is from about 125 degrees to about 155 degrees. In a highly preferred embodiment the obtuse angle is about 135 degrees.

Alternating between the channels are preferably substantially planar surfaces, such that a ripple-like structure is formed. The base and planar surfaces may have substantially the same width (i.e. distance across the short axis of the channel). The width of the base and/or planar surfaces may be at least about 50 mm, 75 mm, 100 mm, 125 mm, 150 mm, 175 mm and 200 mm. In other embodiments, the width of the base and/or planar surfaces is less than about 200 mm, 175 mm, 150 mm, 125 mm, 100 mm, 100 mm, 75 mm or 50 mm. Preferably the width of the base and/or planar surfaces is from about 100 mm to 150 mm. In a highly preferred form of the invention the width of the base and/or planar surfaces is about 125 mm.

In a preferred form of the platform, the widths of the planar surface and the base are substantially equal.

It has been found that a ripple-like structure described above and shown in the drawings have substantial resistance to torsion, folding, bending and warping. A platform constructed accordingly can therefore withstand the significant forces exerted by a large animal (such as an adult cow) while still retaining an effective amount of soil for a convenient time.

The dimensions and angles recited above are applicable where the material used is 3 mm mild steel plate. The skilled person fully understands that where other materials are used, and at different thicknesses, the angles and dimensions may need to be altered to provide a platform for the same or similar strength. For example, where a thinner sheet steel is used, the channel base and planar surfaces may need to be narrower, and/or the angle at which the wall extends from the base be smaller. Given the benefit of the present specification, the skilled person is enabled to identify dimensions and angles equivalent to those recited above for any other material. It is to be understood that all such equivalent platforms are included in the ambit of the present invention.

In another aspect, the present invention provides a weighing apparatus comprising a weighing platform and/or associated structure as described herein. Given the benefit of this specification the skilled person is capable of constructing a complete weighing apparatus including features such as load cells, rails, wiring to connect the load cell to a processor-based apparatus and software for the transformation of the electrical signal of the load cell into a weight figure.

Typically, the weighing apparatus is not configured to be fixed, and is transportable or portable to the extent it can be moved from one location to another, optionally with the assistance of a motor vehicle and trailer.

In another aspect the present invention provides a method of weighing an animal, the method comprising the steps of providing the weighing apparatus as described herein, and directing an animal onto the platform, or allowing an animal onto the platform. To conceal at least some of the foreign stimuli from the animal, a natural material (or a simulated natural material) may be overlaid on or about the platform and/or associated structure of the apparatus, before the step of directing an animal on the platform or allowing an animal onto the platform.

The present invention will now be more fully described by reference to the following preferred embodiment.

PREFERRED EMBODIMENT OF THE INVENTION

Figure 1:
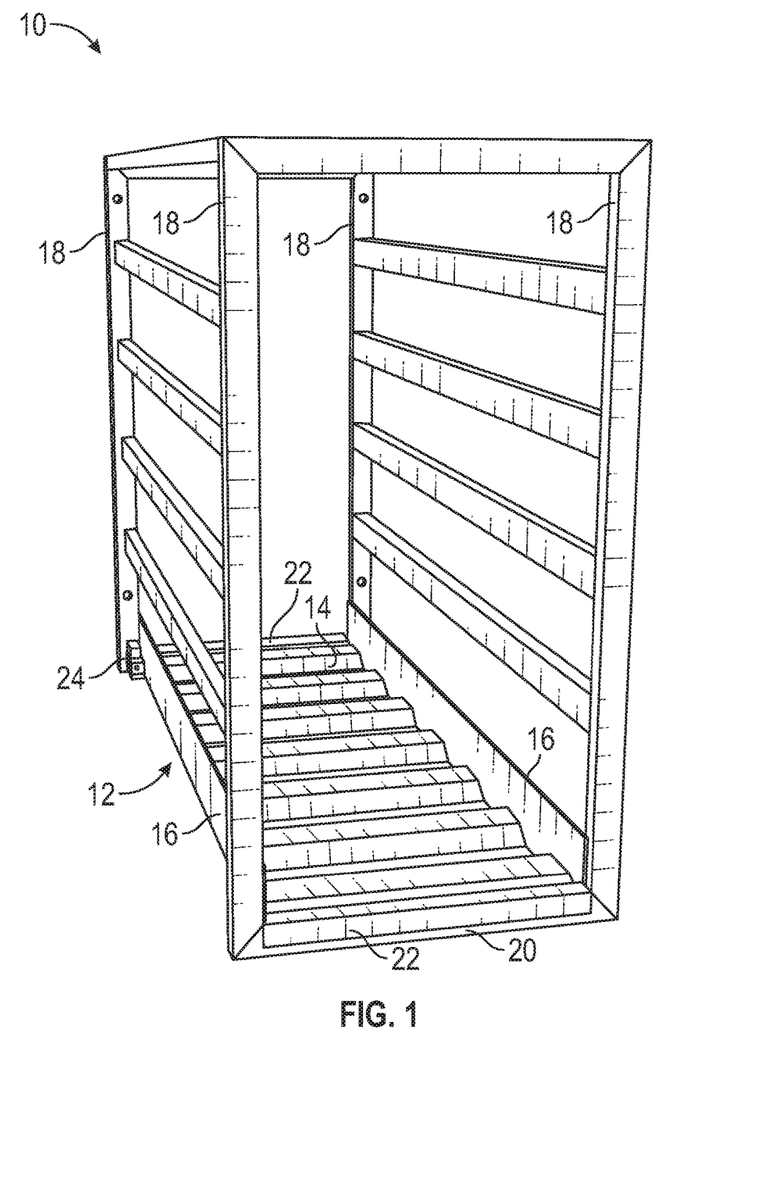
FIG. 1 is an isomeric view of a weighing apparatus of the present invention.

Turning to FIG. 1 there is shown generally a weighing apparatus 10 of the present invention. The apparatus 10 comprises a vertically moveable, elongate platform shown generally at 12. The platform 12 comprises a base 14 and side walls 16 and is configured to retain soil disposed thereon by means of a series of integral ripples (not marked, but apparent in the drawing) and also integral side walls 14. Soil disposed on the platform (not shown) decreases hesitation of an animal being directed onto the platform base 14, thereby decreasing the training time required to train the animal to use the weighing apparatus 10. Further detail on the configuration of the platform base 14 is found in FIG. 2 and is more fully discussed infra.

The weighing apparatus 10 further comprises four upright posts 18. The platform 12 is vertically moveable relative to the posts 18. Accordingly, a gap (not shown) is formed between the platform base 14 and the cross member 20, the gap being covered by a flexible panel 22. The role of the panel 22 is to prevent entry of soil into the gap, and therefore underneath the platform 12. Given that the platform 12 must be freely vertically moveable in order for weight to be correctly recorded, prevention of soil build up due to disruption of soil on or about the platform 12 by the animal is desirable.

The platform 12 is suspended slightly above the ground, just sufficient to allow free vertical movement. The platform 12 is suspended at each corner by a load cell 24 (only one of the three shown in the drawing). Downward vertical movement of the platform 12 as caused by an animal disposed thereon places the load cells 24 under tension, the amount of tension being transformed into a weight recording (not shown).

Figure 2:
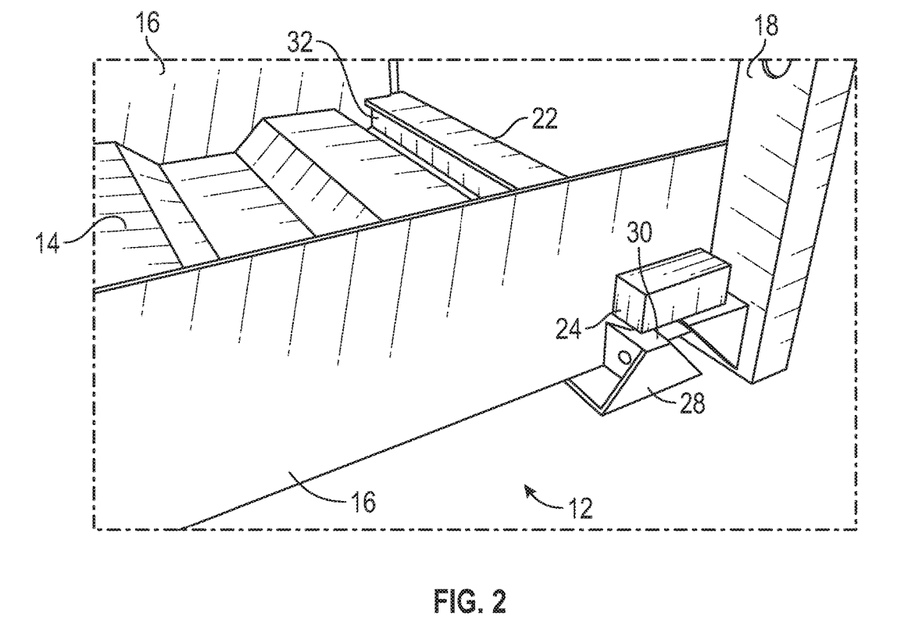
FIG. 2 is a detailed isometric view of the arrangement of a load cell of the weighing apparatus of FIG. 1.

In this embodiment, the load cells 24 are disposed lateral to the platform 12 allowing the platform 12 to be disposed closer to the underlying ground. By this arrangement, the distance between the ground and the platform 12 is smaller, as compared with the arrangement where the load cells are disposed beneath the platform 12, as is typical in the art. In other embodiments, the load cells are disposed beneath the platform (not shown). Turning now to FIG. 2, which more clearly shows the suspension of the platform 10 by the load cell 24. The load cell 24 is mounted on a support bracket 26, the support bracket 26 in turn mounted on the post 18. The platform 12 has a suspension bracket 28, to which is bolted the tension arm 30 of the load cell. By this arrangement, it will be seen that the platform 12 is disposed just interior and suspended by the load cell 24 such that when an animal steps onto the platform base 14, the base 14 moves vertically downwardly, thereby placing the arm 30 of the load cell 24 in tension, to record the animal's weight.

FIG. 2 also shows in greater detail the disposition of the flexible panel 22 in relation to the platform base 14. The arrangement requires a vertical plate 32 made of the same 3 mm steel plate from which the platform is fabricated. The vertical plate 32 is welded to the underlying platform. By this arrangement the platform 12 is able to move vertically, and create a gap between the edge of the platform base 142 and the adjacent cross member 22 while the gap is still covered by the flexible panel 22.

Figure 3A:
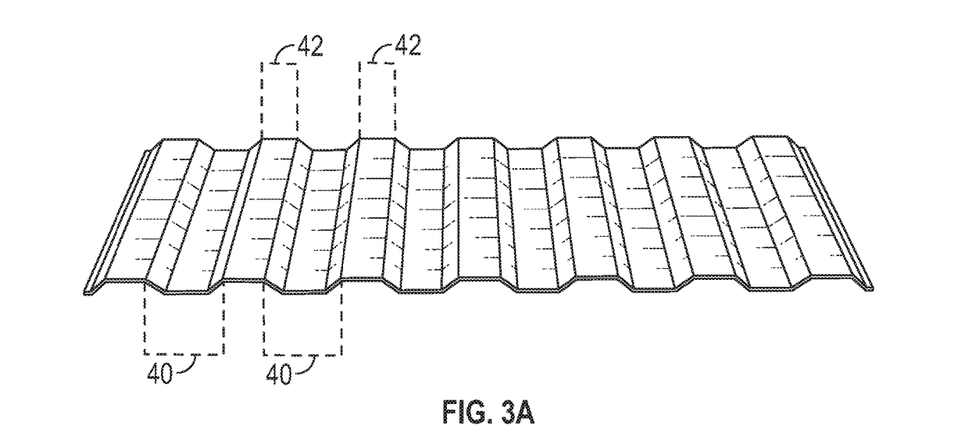
FIG. 3A is a top elevation of the weighing platform of the weighing apparatus of FIG. 1.

The platform base 14 is shown in greater detail at FIG. 3A. The platform is fabricated from a single sheet of 3 mm mild steel. A series of depressions (two are shown marked 40) are interposed with planar areas (two are shown, marked 42) to provide a ripple-like structure. In use, the depressions act to retain soil overlaid on the platform base 14 (not shown). The depressions 42 are overfilled with soil, such that the planar areas 42 are also covered with soil (not shown). As will be clear from FIGS. 1 and 2, the side walls 16 are disposed so as to retain soil within the depressions and to prevent soil from existing via the long edges of the base 14.

Figure 3B:
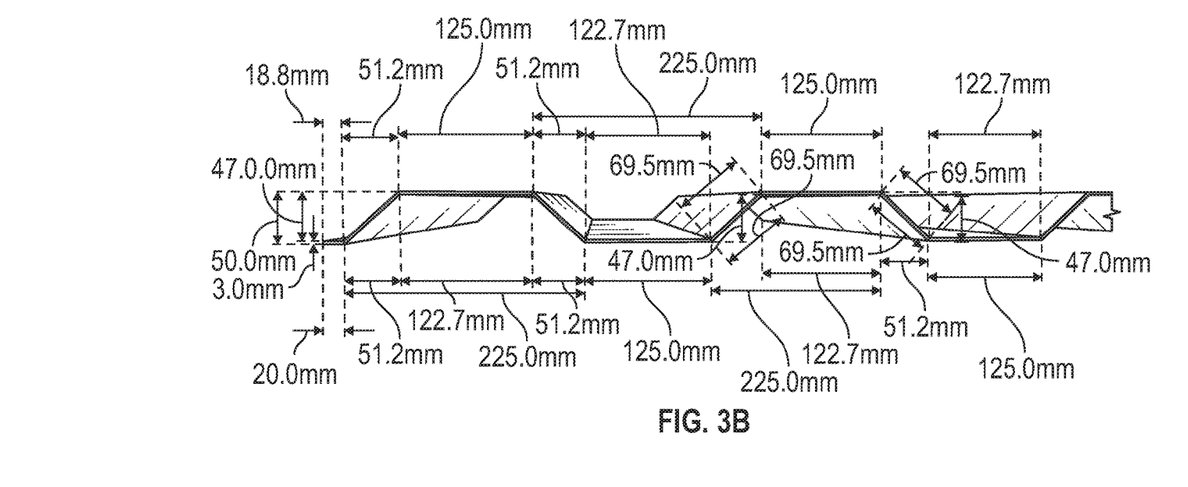
FIG. 3B is a lateral view of the weighing platform of FIG. 3A.

FIG. 3B shows the dimensions and angles of the base of the preferred embodiment.

Figure 4:
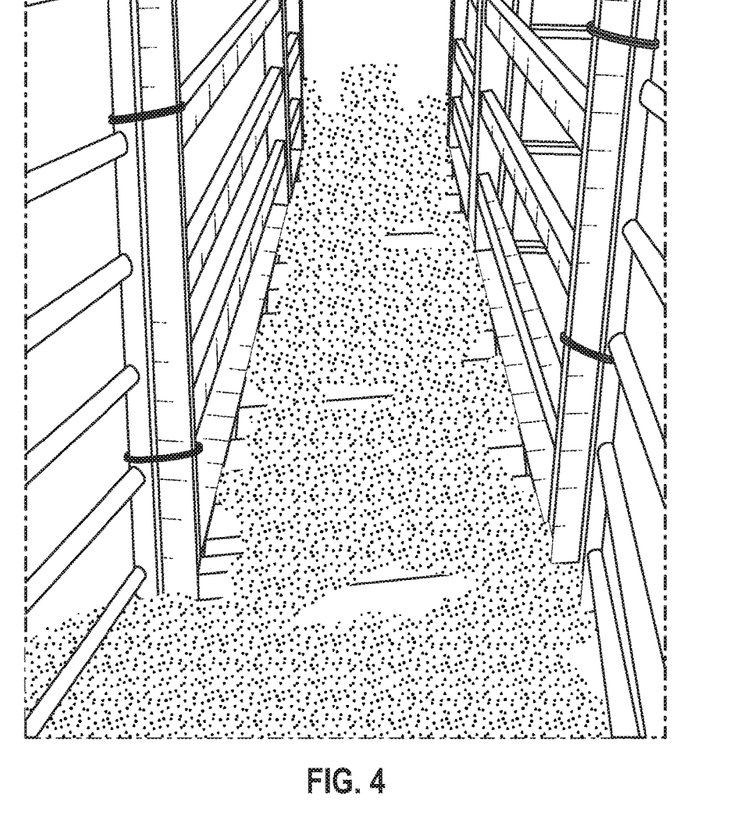
FIG. 4 is a photograph of a weighing apparatus of the present invention, looking downwardly onto the weighing platform, which in this photograph is covered by soil.

FIG. 4 shows the apparatus having the platform base covered in soil. The soil was obtained from the surrounding area, and was therefore not foreign the animal.

Figure 5:
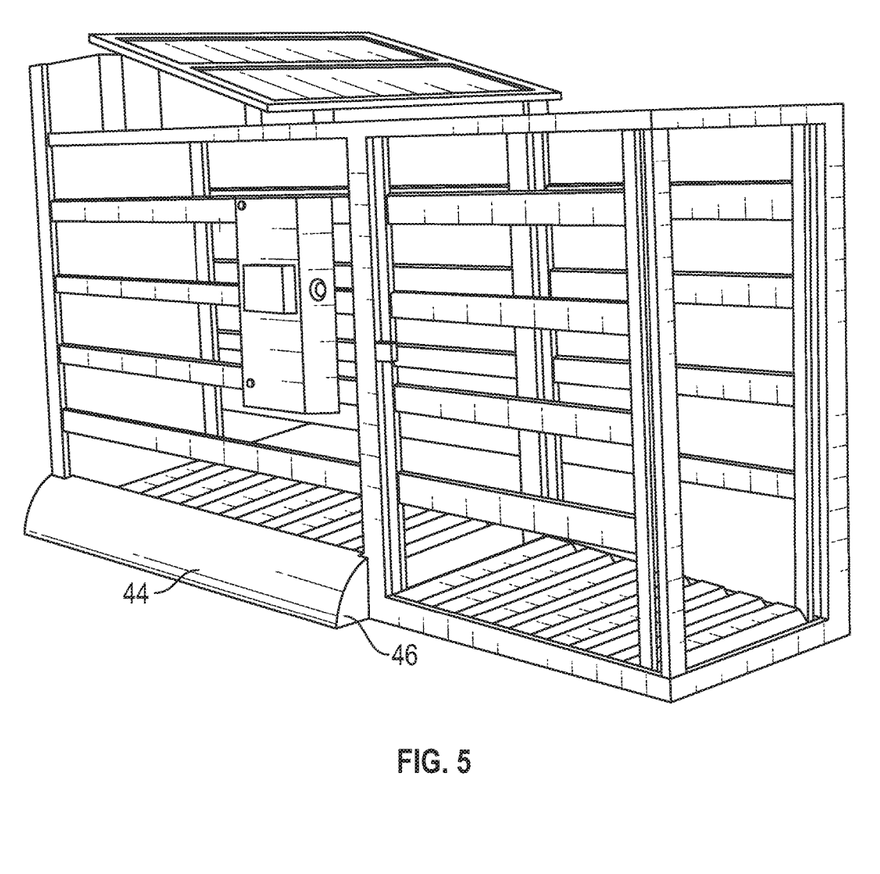
FIG. 5 is a photograph of the weighing apparatus of FIG. 4, devoid of soil.

FIG. 5 shows the apparatus, having in place a flexible panel 44 disposed along the lower edge of the apparatus. The upper long edge of the flexible panel 44 is attached to the upper long edge of the side wall 16 (not shown), with the opposing long edge of the flexible panel 44 abutting the ground. A plate 46 is attached to the short edge of the flexible panel 44. By this arrangement, soil is excluded from the area under the platform 12, and also the area about the load cell 24 (not shown).

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. An animal weighing system comprising:
a weighing apparatus; and
a natural substrate adjacent the apparatus allowing for passage of an animal toward the apparatus,
the weighing apparatus comprising a platform for weighing an animal, the platform having a substantially continuous overlay of a sufficient amount of a natural material or a simulated natural material to conceal a visual stimulus of the platform from the animal, wherein the natural material or the simulated natural material has a similar appearance to the substrate adjacent the weighing apparatus.

2. The animal weighing system of claim 1 wherein the natural material or the simulated natural material conceals a tactile stimulus, or an olfactory stimulus, or an auditory stimulus of the platform from the animal.

3. The animal weighing system of claim 2 wherein the visual stimulus relates to a material of the platform, or a position of the platform.

4. The animal weighing system of claim 2 wherein the visual stimulus is the substantially uniform appearance or the high reflectance of the platform, or a step formed by the platform with the surrounding ground.

5. The animal weighing system of claim 2 wherein the tactile stimulus is that resulting from the contact of a limb of the animal on a raised edge of the platform.

6. The animal weighing system of claim 2 wherein the tactile stimulus is the texture, give or temperature of the platform under foot.

7. The animal weighing system of claim 2 wherein the tactile stimulus is the movement of the platform under foot.

8. The animal weighing system of claim 2 wherein the olfactory stimulus relates to a material of the platform.

9. The animal weighing system of claim 2 wherein the auditory stimulus is the sound made by an animal's foot when contacting the platform.

10. The animal weighing system of claim 1 wherein the platform with the overlay of natural material or simulated natural material thereon resembles a natural ground surface.

11. The animal weighing system of claim 1 wherein the natural material is a soil and/or sand and/or a gravel, and/or a grass.

12. The animal weighing system of claim 1 wherein the simulated natural material has the appearance and/or feel, and or smell and/or sound of soil, sand, gravel, grass or leaves.

13. The animal weighing system of claim 1 configured to retain a natural material or a simulated natural material on or about the platform.

14. The animal weighing system of claim 1 comprising a series of depressions configured to retain the natural material or simulated natural material.

15. The animal weighing system of claim 1 comprising one or more retaining members configured to retain the natural material on or about the platform.

16. The animal weighing system of claim 1 configured such that the platform is configured to be (i) substantially flush with the surrounding ground, or (ii) to appear to the animal to be substantially flush with the surrounding ground when a natural material is retained on or about the platform.

17. The animal weighing system of claim 1 comprising one or more load cells, wherein the one or more load cells is/are disposed substantially lateral to or beneath the weighing platform.

18. A method of weighing an animal, the method comprising:
providing an animal weighing system comprising:
a weighing apparatus, wherein a natural substrate adjacent the apparatus allows for passage of an animal toward the apparatus,
the weighing apparatus comprising a platform for weighing an animal, the platform having a substantially continuous overlay of a sufficient amount of a natural material or a simulated natural material to conceal a visual stimulus of the platform from the animal, wherein the natural material or the simulated natural material has a similar appearance to the substrate adjacent the weighing apparatus, and
directing an animal onto the platform, or allowing an animal onto the platform.

19. A method of preparing an animal weighing system comprising:
providing a weighing apparatus having a platform, disposing the weighing apparatus on a substrate, and
a human operator depositing a substantially continuous overlay of a sufficient amount of a natural material or a simulated natural material having a similar appearance to the substrate adjacent the weighing apparatus so as to conceal a visual stimulus of the platform from an animal.

20. The method of claim 18, wherein the animal is a farm animal of economic significance comprising an animal selected from the group consisting of a cow and a sheep.

\* \* \* \* \*